(12) United States Patent
Matsuoka

(10) Patent No.: US 11,542,133 B2
(45) Date of Patent: Jan. 3, 2023

(54) EXTENDABLE ARM

(71) Applicant: FUJIMIYASEISAKUSHO CO., LTD., Kumamoto (JP)

(72) Inventor: Norimichi Matsuoka, Kumamoto (JP)

(73) Assignee: FUJIMIYASEISAKUSHO CO., LTD., Kumamoto (JP)

( * ) Notice: Subject to any disclaimer, the term of this patent is extended or adjusted under 35 U.S.C. 154(b) by 553 days.

(21) Appl. No.: 16/584,669

(22) Filed: Sep. 26, 2019

(65) Prior Publication Data

US 2020/0283276 A1    Sep. 10, 2020

(30) Foreign Application Priority Data

Mar. 4, 2019 (JP) .............................. JP2019-038340

(51) Int. Cl.
| B66F 3/22 | (2006.01) |
| E04B 1/19 | (2006.01) |
| E04B 1/344 | (2006.01) |
| E04B 1/343 | (2006.01) |
| F16M 11/38 | (2006.01) |
| B25J 18/02 | (2006.01) |

(52) U.S. Cl.
CPC .................. B66F 3/22 (2013.01); E04B 1/19 (2013.01); E04B 1/344 (2013.01); B25J 18/02 (2013.01); E04B 1/34357 (2013.01); F16M 11/38 (2013.01)

(58) Field of Classification Search
CPC ........ E04B 1/19; E04B 1/34357; E04B 1/344; E04B 1/3441
USPC ......................................................... 52/109
See application file for complete search history.

(56) References Cited

U.S. PATENT DOCUMENTS

| 1,526,463 | A | * | 2/1925 | Frease | ....................... E04C 2/40 |
| | | | | | 52/634 |
| 3,961,455 | A | * | 6/1976 | Peters | ................... E04B 1/2612 |
| | | | | | 52/693 |
| 4,175,644 | A | * | 11/1979 | Sikli | ......................... B66F 3/22 |
| | | | | | 187/269 |
| 4,557,083 | A | * | 12/1985 | Zanardo | ............... H01Q 1/1235 |
| | | | | | 52/109 |

(Continued)

FOREIGN PATENT DOCUMENTS

| CN | 104540649 A | 4/2015 |
| CN | 107756444 A | 3/2018 |

(Continued)

*Primary Examiner* — Brian D Mattei
*Assistant Examiner* — Joseph J. Sadlon
(74) *Attorney, Agent, or Firm* — Hauptman Ham, LLP

(57) ABSTRACT

An extendable arm includes first and second rigid members forming a cross unit. Each rigid member includes one end portion including one of end coupling shafts, the other end portion including the other end coupling shaft, and a middle portion including a middle coupling shaft. The one end portion of each rigid member includes a bottom-side outer side surface that surface-contacts a base surface when the extendable arm in an extended state is placed thereon. The other end portion of each rigid member includes a top-side outer side surface extending parallel to the bottom-side outer side surface of each rigid member. The middle portion of each rigid member includes a middle strip region passing through a middle coupling shaft and perpendicular to the bottom-side outer side surface and the top-side outer side surface.

10 Claims, 14 Drawing Sheets

(56) References Cited

U.S. PATENT DOCUMENTS

| | | | | |
|---|---|---|---|---|
| 4,630,627 | A * | 12/1986 | Windows | E04H 15/48 |
| | | | | 135/912 |
| 4,660,346 | A * | 4/1987 | Burger | E04C 3/08 |
| | | | | 52/693 |
| 5,230,196 | A * | 7/1993 | Zeigler | G09F 15/0068 |
| | | | | 52/81.3 |
| 5,379,977 | A * | 1/1995 | Ronn | B66F 7/0666 |
| | | | | 248/327 |
| 5,542,806 | A | 8/1996 | Kang | |
| 5,681,045 | A * | 10/1997 | Liao | A63B 63/004 |
| | | | | 403/92 |
| 6,082,056 | A * | 7/2000 | Hoberman | A63F 9/088 |
| | | | | 52/80.1 |
| 6,553,698 | B1 * | 4/2003 | Kemeny | G09F 15/0068 |
| | | | | 52/646 |
| 7,100,333 | B2 * | 9/2006 | Hoberman | E04B 1/3441 |
| | | | | 52/80.1 |
| 7,686,255 | B2 * | 3/2010 | Harris | B64G 1/222 |
| | | | | 244/172.6 |
| 8,484,925 | B2 * | 7/2013 | Daas | B66C 23/70 |
| | | | | 52/645 |
| 9,970,190 | B2 * | 5/2018 | Benthien | B64C 3/48 |
| 10,006,195 | B2 * | 6/2018 | Matsuoka | F16M 11/38 |
| 10,253,854 | B2 * | 4/2019 | Martyn | F16H 21/04 |
| 10,626,611 | B2 * | 4/2020 | Thrall | E04B 1/40 |
| 2008/0283670 | A1 * | 11/2008 | Harvey | B64G 1/222 |
| | | | | 244/172.6 |

FOREIGN PATENT DOCUMENTS

| | | |
|---|---|---|
| JP | S54-115135 U | 8/1979 |
| JP | S55-116991 | 9/1980 |
| JP | 2014159070 A | 9/2014 |

* cited by examiner

EXTENDABLE ARM

BACKGROUND OF THE INVENTION

Field of the Invention

The present invention relates to extendable arms that can be extended and contracted, and more particularly to an extendable arm comprised of a plurality of X-shaped cross units arranged in one direction and pivotally coupled to each other.

Background Art

The applicant of the present application proposed in Japanese Unexamined Patent Publication No. 2014-159070 an extendable arm that extends and contracts in a linear or curved fashion. This extendable arm is comprised of a plurality of cross units connected linearly, and each cross unit is comprised of two rigid members crossing each other in an X-shape.

RELATED ART DOCUMENTS

Patent Documents

[Patent Document 1] Japanese Unexamined Patent Publication No. 2014-159070

SUMMARY OF INVENTION

Extendable arms in a contracted state are convenient to carry and store due to their compactness. However, when used for partitions, furniture, building structures, etc., the extendable arms are in an extended state and serve as partition walls in a large space. Multiple extendable arms can also be used to produce a variable area frame or a variable volume three-dimensional structure.

In such applications, extendable arms need to have higher rigidity when in an extended state.

It is an object of the present invention to provide an extendable arm having higher rigidity when in an extended state.

An extendable arm according to the present invention is comprised of a plurality of cross units arranged in one direction and pivotally coupled to each other. Each of the cross units is comprised of first and second rigid members crossing each other in an X shape and pivotally coupled at their intersection via a middle coupling shaft. Adjacent ones of the cross units are pivotally coupled at their ends via upper and lower end coupling shafts.

Each of the rigid members of the cross unit includes one end portion including one of the end coupling shafts, the other end portion including the other end coupling shaft, and a middle portion including the middle coupling shaft.

The one end portion of the first rigid member includes a bottom-side outer side surface that surface-contacts a base surface when the extendable arm in an extended state is placed thereon. The other end portion of the first rigid member includes a top-side outer side surface extending parallel to the bottom-side outer side surface of the first rigid member. The middle portion of the first rigid member includes a middle strip region passing through the middle coupling shaft and perpendicular to the bottom-side outer side surface and the top-side outer side surface of the first rigid member.

The other end portion of the second rigid member includes a bottom-side outer side surface that surface-contacts the base surface when the extendable arm in the extended state is placed thereon. The one end portion of the second rigid member includes a top-side outer side surface extending parallel to the bottom-side outer side surface of the second rigid member. The middle portion of the second rigid member includes a middle strip region passing through the middle coupling shaft and perpendicular to the bottom-side outer side surface and the top-side outer side surface of the second rigid member.

In one embodiment, each of the rigid members is shaped so that an imaginary line connecting the end coupling shafts and the middle coupling shaft extends straight. In another embodiment, each of the rigid members is shaped so that an imaginary line connecting the end coupling shafts and the middle coupling shaft is curved in an arc shape.

In one embodiment, the one end portion, the middle portion, and the other end portion of each of the rigid members have a strip shape. In this case, the strip-shaped one end portion and the strip-shaped middle portion meet at right angles, and the strip-shaped middle portion and the strip-shaped other end portion meet at right angles.

In another embodiment, at least one of the strip-shaped one end portion and the strip-shaped other end portion of each of the rigid members includes a tip-end projecting strip portion extending parallel to the strip-shaped middle portion from a tip end of the at least one of the strip-shaped one end portion and the strip-shaped other end portion. A tip end face of the tip-end projecting strip portion may abut on an inner side surface of the rigid member of the adjacent cross unit when the extendable arm is in the extended state.

In still another embodiment, both the strip-shaped one end portion and the strip-shaped other end portion of each of the rigid members include the tip-end projecting strip portion. In this case, a tip end face of each of the tip-end projecting strip portions may abut on a tip end face of the tip-end projecting strip portion of the rigid member of the adjacent cross unit when the extendable arm is in the extended state.

In yet another embodiment, an inner side surface of the one end portion of the first rigid member abuts on an inner side surface of the other end portion of the first rigid member of the adjacent cross unit when the extendable arm is in the extended state. An inner side surface of the one end portion of the second rigid member abuts on an inner side surface of the other end portion of the second rigid member of the adjacent cross unit when the extendable arm is in the extended state.

In a further embodiment, each of the rigid members has a parallelogram outer shape. In this case, an outer side surface of each of the rigid members surface-contacts the base surface when the extendable arm in the extended state is placed thereon. A tip end face of the one end portion of each of the rigid members abuts on a rear end face of the other end portion of the rigid member of the adjacent cross unit when the extendable arm is in the extended state.

In an application example of the above embodiment, a tip end face of the one end portion of each of the rigid members may have a first stepped portion with a step shape, and a tip end face of the other end portion of each of the rigid members may have a second stepped portion that mates with the first stepped portion.

According to the extendable arm of the present invention, when the extendable arm is in the extended state, the bottom-side outer side surface of each rigid member surface-contacts the base surface, the top-side outer side surface of each rigid member extends to the bottom-side outer side surface of the rigid member, and the middle strip region of each rigid member which includes the middle coupling shaft is perpendicular to both the bottom-side outer side surface and the top-side outer side surface of the rigid member. The extendable arm is therefore highly rigid against a vertical load.

DESCRIPTION OF EMBODIMENTS

Figure 1:
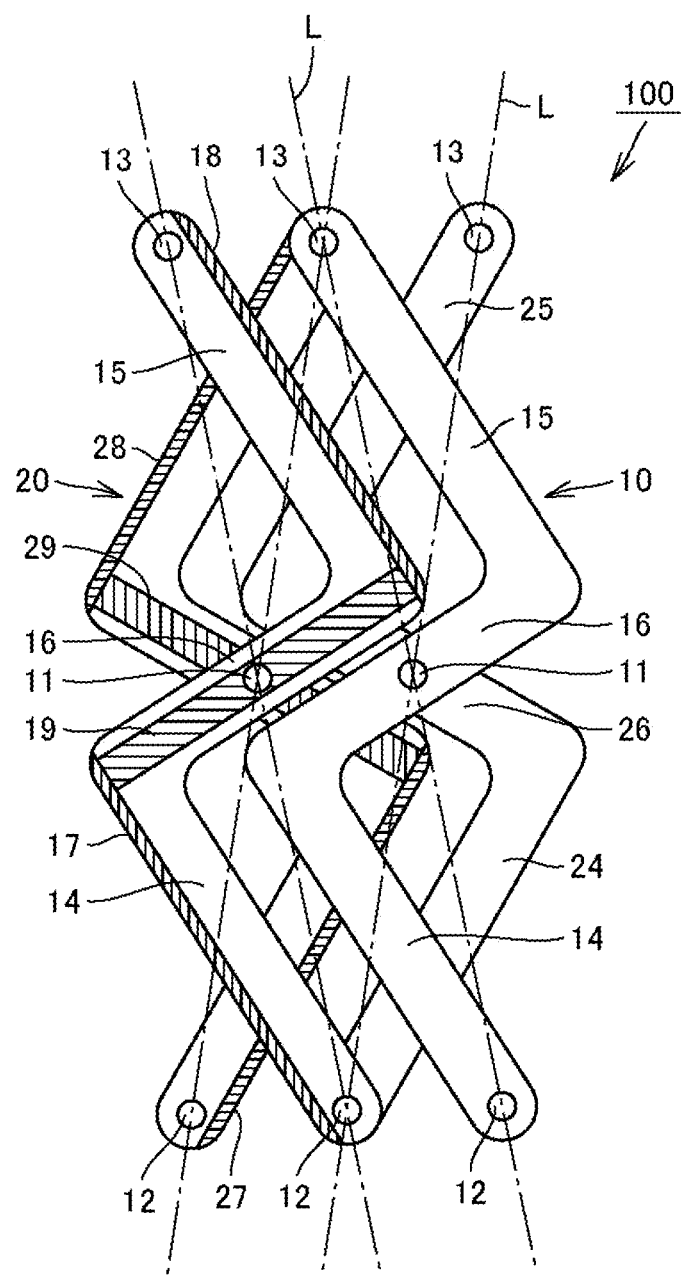
FIG. 1 is a front view of an extendable arm according to an embodiment of the present invention in a contracted state.

Embodiments of an extendable arm according to the present invention will be described with reference to the drawings. Elements having the same or similar function are denoted with the same reference characters throughout the figures.

Figure 2:
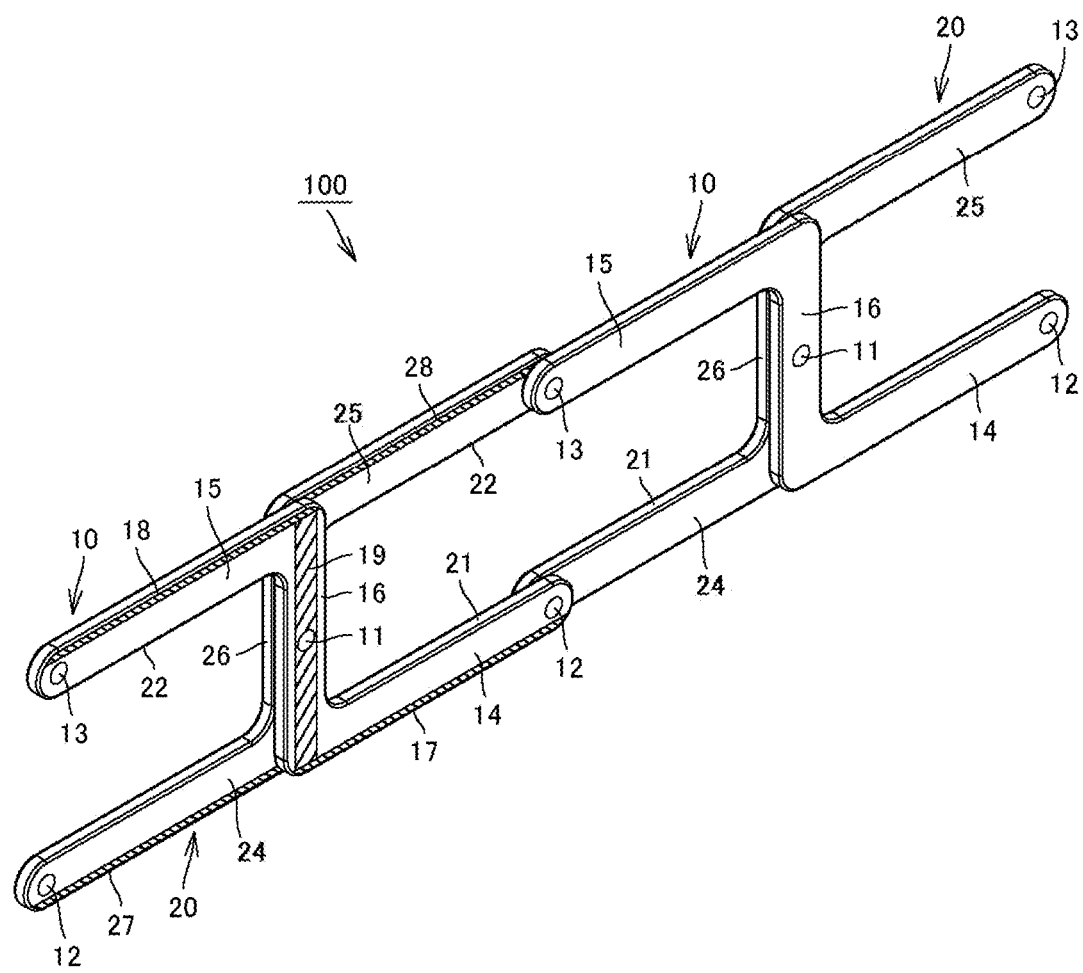
FIG. 2 is a perspective view of the extendable arm of FIG. 1 in an extended state.

Embodiment of FIGS. 1 and 2

An extendable arm 100 is comprised of a plurality of cross units arranged in one direction and pivotally coupled to each other. More specifically, each cross unit is comprised of a first rigid member 10 and a second rigid member 20 which cross each other in an X-shape and are pivotally coupled at their intersection via a middle coupling shaft 11. Adjacent ones of the cross units are pivotally coupled at their ends via upper and lower end coupling shafts 13, 12. Although two cross units are coupled in the illustrated example, any number of cross units may be coupled together.

The first rigid member 10 includes: one end portion 14 including a lower end coupling shaft (lower coupling shaft) 12; the other end portion 15 including an upper end coupling shaft (upper coupling shaft) 13; and a middle portion 16 including a middle coupling shaft 11. The second rigid member 20 includes: one end portion 24 including a lower coupling shaft 12; the other end portion 25 including an upper coupling shaft 13; and a middle portion 26 including the middle coupling shaft 11.

In the illustrated embodiment, each rigid member 10, 20 is shaped so that an imaginary line L connecting the end coupling shafts 12, 13 and the middle coupling shaft 11 extends straight as viewed from the front.

Each rigid member 10, 20 shown in FIGS. 1 and 2 is a bent strip member with two right-angled corners. Specifically, each of the one end portion 14, 24, the middle portion 16, 26, and the other end portion 15, 25 of each rigid member 10, 20 has a strip shape with a constant thickness and a constant width. The strip-shaped one end portion 14, 24 and the strip-shaped middle portion 16, 26 meet at right angles, and the strip-shaped middle portion 16, 26 and the strip-shaped other end portion 15, 25 meet at right angles.

FIG. 1 shows the extendable arm 100 in a contracted state, and FIG. 2 shows the extendable arm 100 in an extended state. The tip end side (the right side in FIG. 2) of the extendable arm 100 in an extended state shown in FIG. 2 is defined as "one end side," and the rear end side (the left side in FIG. 2) thereof is defined as the "other end side."

As shown in the figures, the one end portion 14 of the first rigid member 10 of the cross unit located on the other end side and the other end portion 24 of the second rigid member 20 of its adjacent cross unit located on the one end side are pivotally coupled via the lower coupling shaft 12. The other end portion 15 of the first rigid member 10 of the cross unit located on the one end side and the one end portion 25 of the second rigid member 20 of its adjacent cross unit located on the other end side are pivotally coupled via the upper coupling shaft 13.

In the illustrated embodiment, the one end portions 14, 24 and the other end portions 15, 25 of the rigid members 10, 20 have the same length. When the extendable arm 100 is in an extended state as shown in FIG. 2, the middle portion 16 of the first rigid member 10 and the middle portion 26 of the second rigid member 20 completely overlap each other.

As shown in FIG. 2, the one end portion 14 of the first rigid member 10 includes a bottom-side outer side surface 17 that surface-contacts a base surface when the extendable arm 100 in an extended state is placed thereon. When the base surface is flat, the bottom-side outer side surface 17 linearly surface-contacts the base surface. The other end portion 15 of the first rigid member 10 includes a top-side outer side surface 18 in its top surface portion. The top-side outer side surface 18 extends parallel to the bottom-side outer side surface 17 of the first rigid member 10. The middle portion 16 of the first rigid member 10 includes a middle strip region 19 passing through the middle coupling shaft 11 and perpendicular to the bottom-side outer side surface 17 and the top-side outer side surface 18 of the first rigid member 10. For clarity, the bottom-side outer side surface 17, the top-side outer side surface 18, and the middle strip region 19 are shown hatched in FIG. 2.

As used herein, the "side surfaces" of the rigid member refer to two side surfaces defining the lateral dimension of each strip-shaped rigid member with a predetermined thickness and a predetermined width. Of the two side surfaces, the lowermost side surface that contacts the base surface when the extendable arm in an extended state is placed thereon is referred to as the "bottom-side outer side surface," and the uppermost side surface in the extendable arm is referred to as the "top-side outer side surface." The "inner side surfaces" refer to the opposite surface from the bottom-side outer side surface and the opposite surface from the top-side outer side surface. The inner side surfaces are surfaces 21, 22 in FIG. 2.

The other end portion 24 of the second rigid member 20 includes a bottom-side outer side surface 27 that surface-contacts the base surface when the extendable arm 100 in an extended state is placed thereon. When the base surface is flat, the bottom-side outer side surface 27 linearly surface-contacts the base surface. The one end portion 25 of the second rigid member 20 includes a top-side outer side surface 28 in its top surface portion. The top-side outer side surface 28 extends parallel to the bottom-side outer side surface 27 of the second rigid member 20. The middle portion 26 of the second rigid member 20 includes a middle strip region 29 passing through the middle coupling shaft 11 and perpendicular to the bottom-side outer side surface 27 and the top-side outer side surface 28 of the second rigid member 20.

The middle portions 16 of the first rigid members 10 and the middle portions 26 of the second rigid members 20 of the plurality of cross units forming the extendable arm 100 have the same length. Accordingly, when the extendable arm 100 is placed on a flat base surface, the bottom-side outer side surfaces 17 of the first rigid members 10 and the bottom-side outer side surfaces 27 of the second rigid members 20 are aligned in contact with the flat base surface, and the top-side outer side surfaces 18 of the first rigid members 10 and the top-side outer side surfaces 28 of the second rigid members 20 are aligned parallel to the bottom-side outer side surfaces 17, 27. The middle strip regions 19, 29 perpendicular to the bottom-side outer side surfaces 17, 27 and the top-side outer side surfaces 18, 28 are located between the aligned bottom-side outer side surfaces 17, 27 and the aligned top-side outer side surfaces 18, 28. The extendable arm 100 in an extended state therefore is highly rigid against a vertical load, namely a load acting in a direction perpendicular to the top-side outer side surfaces 18, 28.

The above description is given on the assumption that the base surface extends horizontally. However, the base surface may extend vertically or obliquely. The terms "upper" or "top" and "lower" or "bottom" as used herein indicate relative positions, and it is to be understood that the terms "upper" and "lower" in the above description should be read as "right" and "left" for, e.g., an extendable arm structured to extend and contract in the vertical direction.

Figure 3:
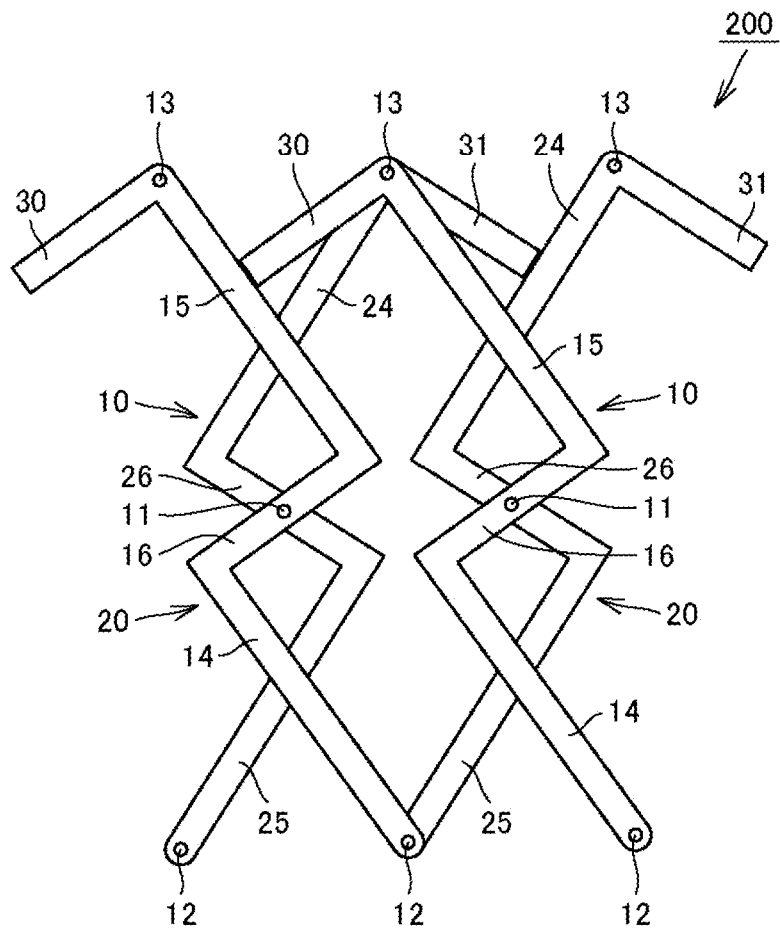
FIG. 3 is a front view of an extendable arm according to another embodiment of the present invention in a contracted state.
Figure 4:
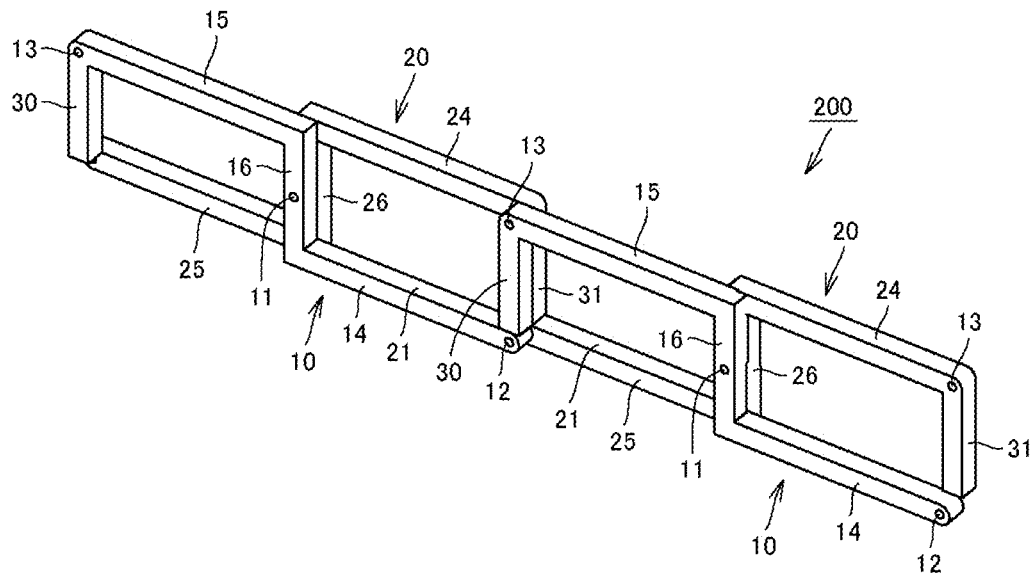
FIG. 4 is a perspective view of the extendable arm of FIG. 3 in an extended state.

Embodiment of FIGS. 3 and 4

An extendable arm 200 shown in FIGS. 3 and 4 is different from the extendable arm 100 shown in FIGS. 1 and 2 in that the first and second rigid members 10, 20 have tip-end projecting strip portions 30, 31, respectively.

Specifically, the first rigid member 10 has a tip-end projecting strip portion 30 extending parallel to the strip-shaped middle portion 16 from the tip end of the strip-shaped other end portion 15. The second rigid member 20 has a tip-end projecting strip portion 31 extending parallel to the strip-shaped middle portion 26 from the tip end of the strip-shaped one end portion 24.

As shown in FIG. 4, when the extendable arm 200 is in an extended state, the tip end face of the tip-end projecting strip portion 30 of the first rigid member 10 abuts on the inner side surface 21 of the strip-shaped one end portion 14 of the first rigid member 10 of its adjacent cross link. The tip end face of the tip-end projecting strip portion 31 of the second rigid member 20 also abuts on the inner side surface 21 of the strip-shaped other end portion 25 of the second rigid member 20 of its adjacent cross link.

The tip-end projecting strip portion 30 is perpendicular to the strip-shaped other end portion 15 of the first rigid member 10, and the tip-end projecting strip portion 31 is perpendicular to the strip-shaped one end portion 24 of the second rigid member 20. The extendable arm 200 in an extended state therefore has further improved rigidity.

Figure 5:
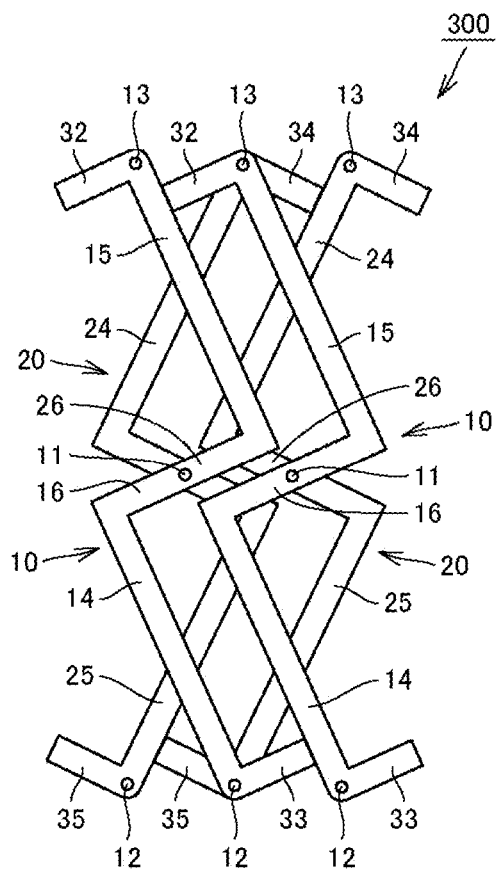
FIG. 5 is a front view of an extendable arm according to still another embodiment of the present invention in a contracted state.
Figure 6:
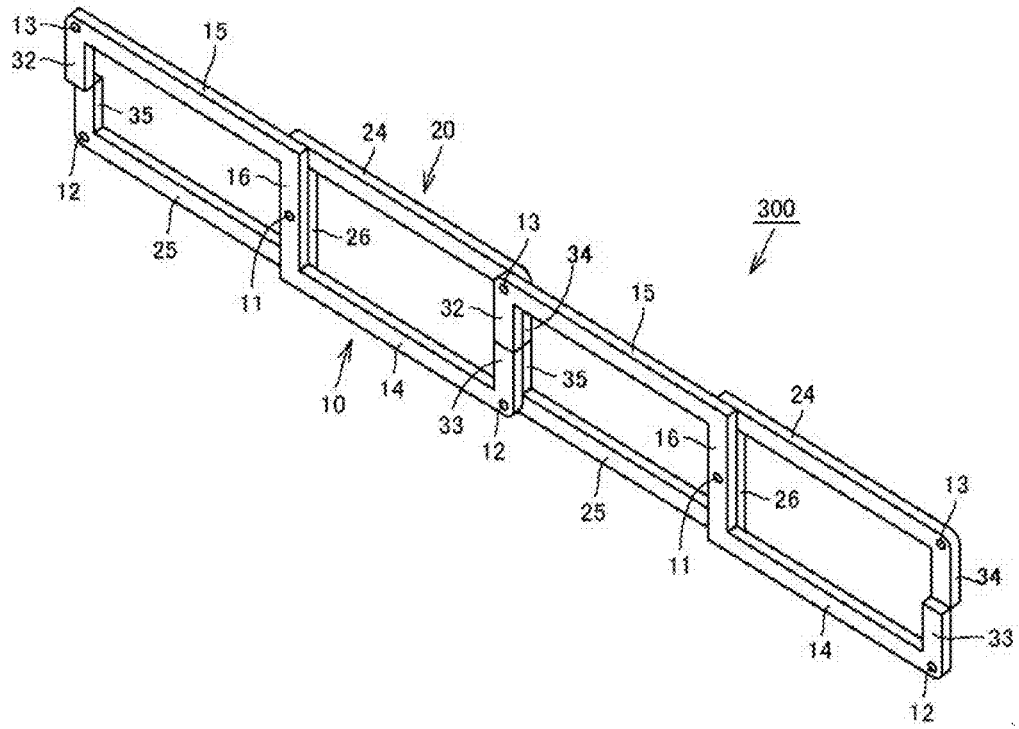
FIG. 6 is a perspective view of the extendable arm of FIG. 5 in an extended state.

Embodiment of FIGS. 5 and 6

An extendable arm 300 shown in FIGS. 5 and 6 is different from the extendable arm 100 shown in FIGS. 1 and 2 in that the first rigid member 10 has tip-end projecting strip portions 32, 33 at its both ends and the second rigid member 20 has tip-end projecting strip portions 34, 35 at its both ends.

Specifically, the first rigid member 10 has a tip-end projecting strip portion 32 extending parallel to the strip-shaped middle portion 16 from the tip end of the strip-shaped other end portion 15, and a tip-end projecting strip portion 33 extending parallel to the strip-shaped middle portion 16 from the tip end of the strip-shaped one end portion 14. The second rigid member 20 has a tip-end projecting strip portion 34 extending parallel to the strip-shaped middle portion 26 from the tip end of the strip-shaped other end portion 24, and a tip-end projecting strip portion 35 extending parallel to the strip-shaped middle portion 26 from the tip end of the strip-shaped one end portion 25.

As shown in FIG. 6, when the extendable arm 300 is in an extended state, the downward-facing tip end face of the tip-end projecting strip portion 32 of the first rigid member 10 abuts on the upward-facing tip end face of the tip-end projecting strip portion 33 of the first rigid member 10 of its adjacent cross link. The upward-facing tip end face of the tip-end projecting strip portion 35 of the second rigid member 20 also abuts on the downward-facing tip end face of the tip-end projecting strip portion 34 of the second rigid member 20 of its adjacent cross link.

The tip-end projecting strip portions 32, 33 abutting on each other rigidly maintains the interval between the strip-shaped one end portion 14 and the strip-shaped other end portion 15 of the first rigid members 10. Similarly, the tip-end projecting strip portions 34, 35 abutting on each other rigidly maintains the interval between the strip-shaped one end portion 24 and the strip-shaped other end portion 25 of the second rigid members 20. The extendable arm 300 in an extended state thus has further improved rigidity.

Figure 7:
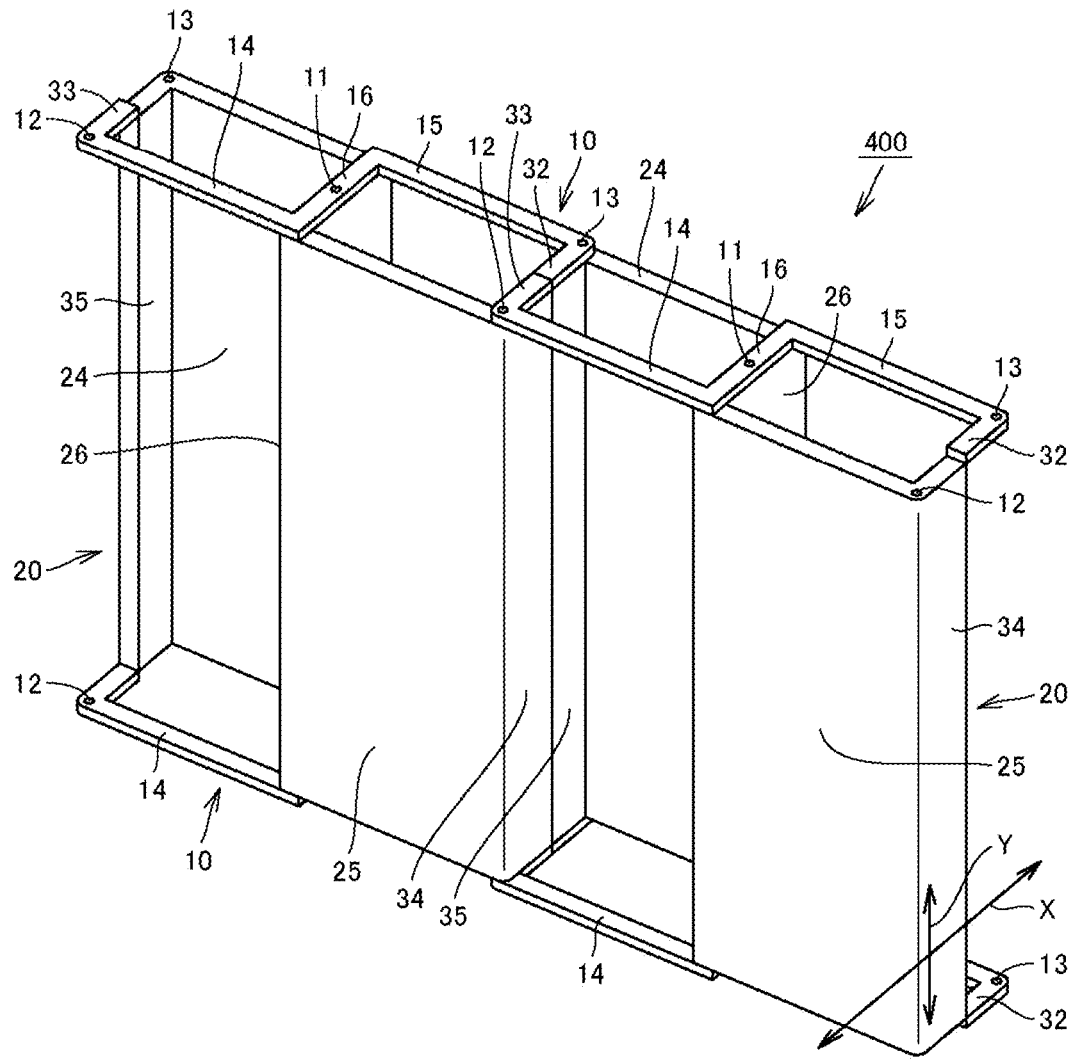
FIG. 7 is a perspective view of an extendable arm according to yet another embodiment of the present invention in an extended state.

Embodiment of FIG. 7

An extendable arm 400 shown in FIG. 7 is different from the extendable arm 300 shown in FIGS. 5 and 6 in that the extendable arm 400 includes two first rigid members 10 separated from each other in the vertical direction and second rigid members 20 sandwiched between the first rigid members 10 and longer in the vertical direction (thickness direction). According to the present embodiment, the extendable arm 400 in an extended state has improved rigidity both in the direction in which the strip-shaped middle portion 16 of the first rigid member 10 extends (X direction in FIG. 7) and in the thickness direction of the first and second rigid members 10, 20 (Y direction in FIG. 7).

Figure 8:
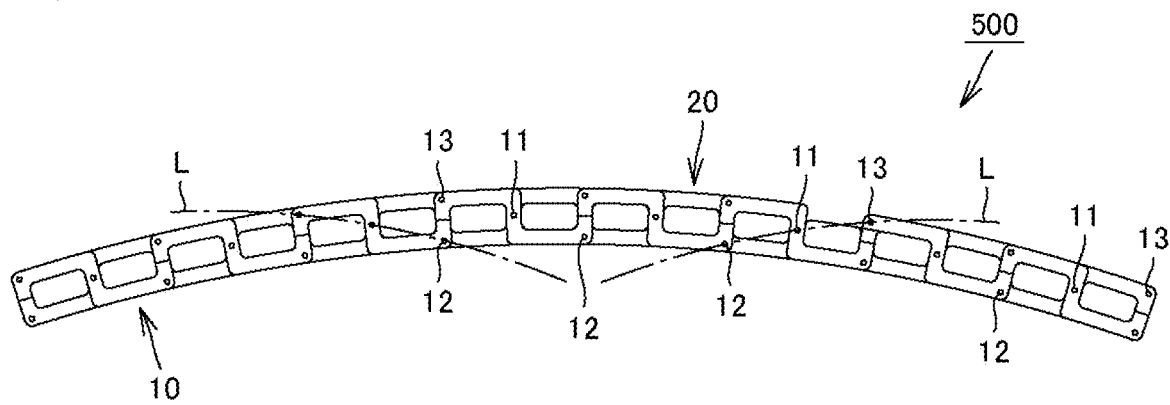
FIG. 8 is a front view of an extendable arm according to a further embodiment of the present invention in an extended state.

Embodiment of FIG. 8

An extendable arm 500 shown in FIG. 8 is different from the extendable arm 400 shown in FIG. 7 in that the first and second rigid members 10, 20 are shaped so that an imaginary line L connecting the end coupling shafts 12, 13 and the middle coupling shaft 11 is curved in an arc shape as viewed from the front. As shown in FIG. 8, the extendable arm 500 has a curved shape when in an extended state. In the present embodiment, when a base surface on which the extendable arm 500 is placed is a curved surface, the bottom-side outer side surface of each rigid member 10, 20 surface-contacts the base surface in a curved manner.

Figure 9:
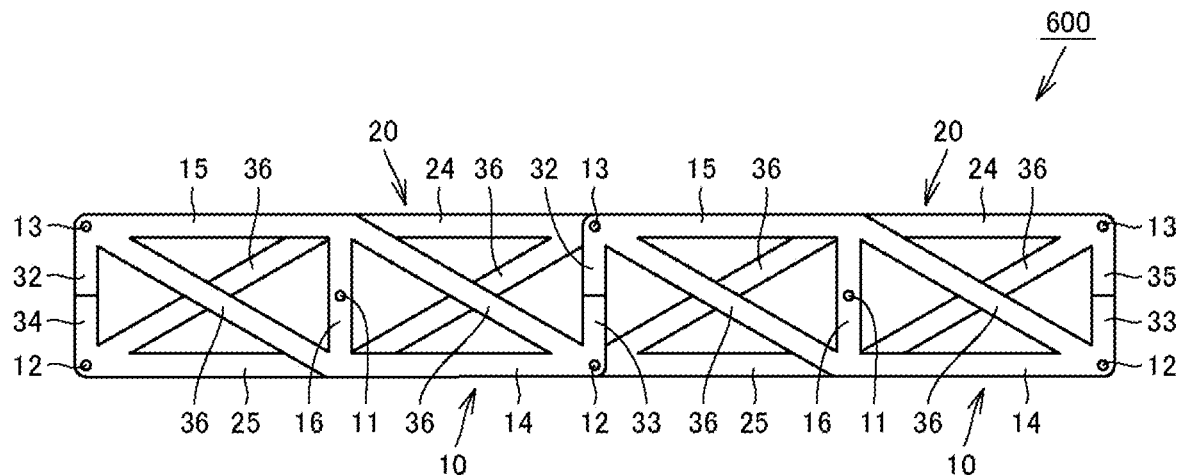
FIG. 9 is a front view of an extendable arm according to a still further embodiment of the present invention in an extended state.
Figure 10:
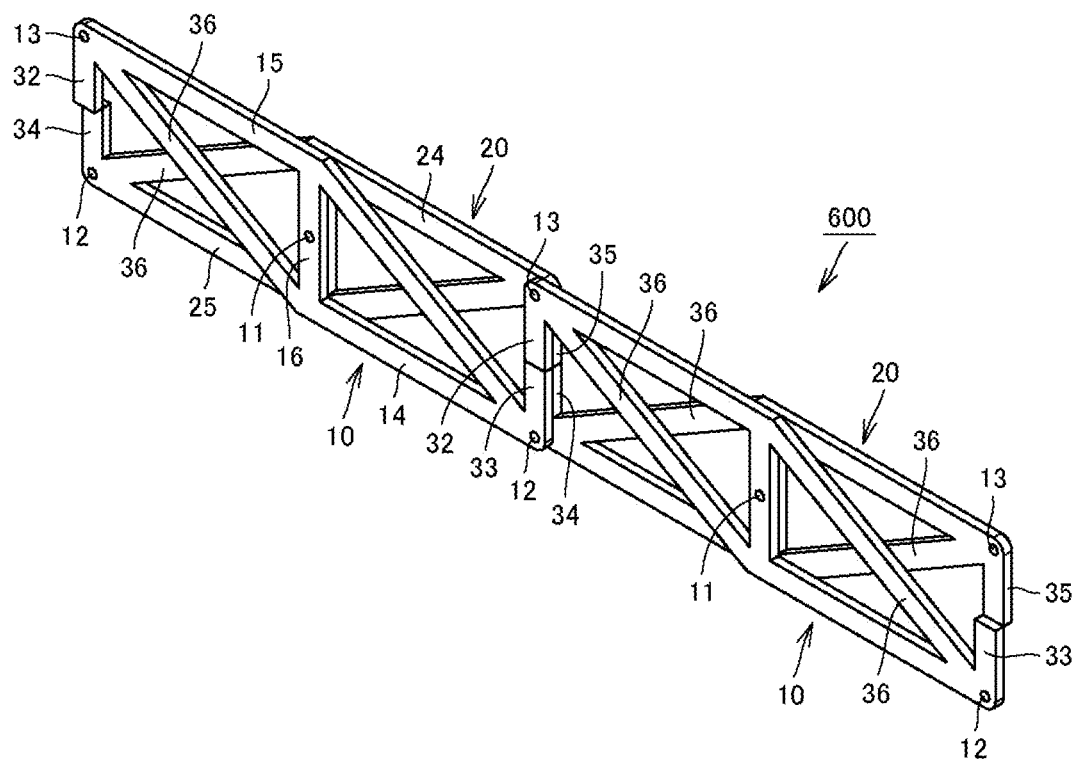
FIG. 10 is a perspective view of the extendable arm of FIG. 9.

Embodiment of FIGS. 9 and 10

An extendable arm 600 shown in FIGS. 9 and 10 is different from the extendable arm 300 shown in FIGS. 5 and 6 in that each rigid member 10, 20 includes oblique strip portions 36 each extending obliquely so as to connect diagonally opposite corners. The extendable arm 600 including the oblique strip portions 36 has improved rigidity against deformation of each rigid member 10, 20.

Figure 11:
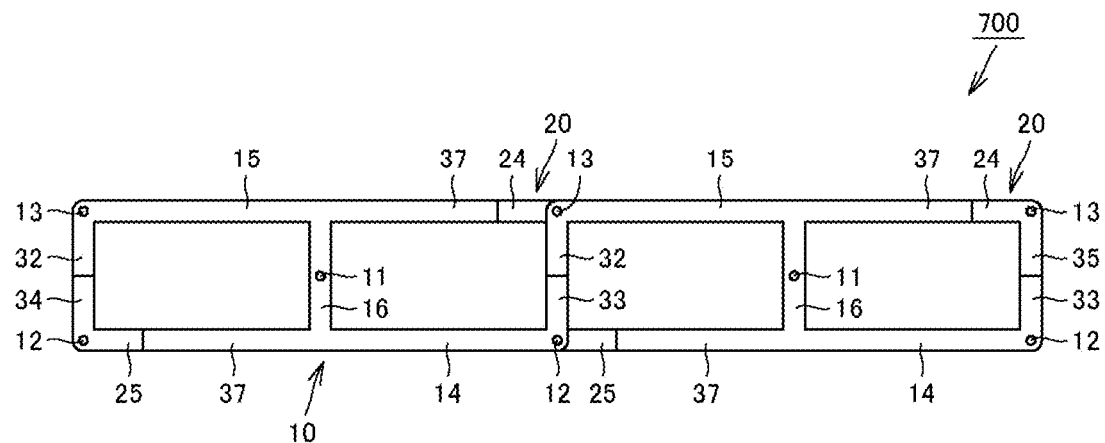
FIG. 11 is a front view of an extendable arm according to a yet further embodiment of the present invention in an extended state.
Figure 12:
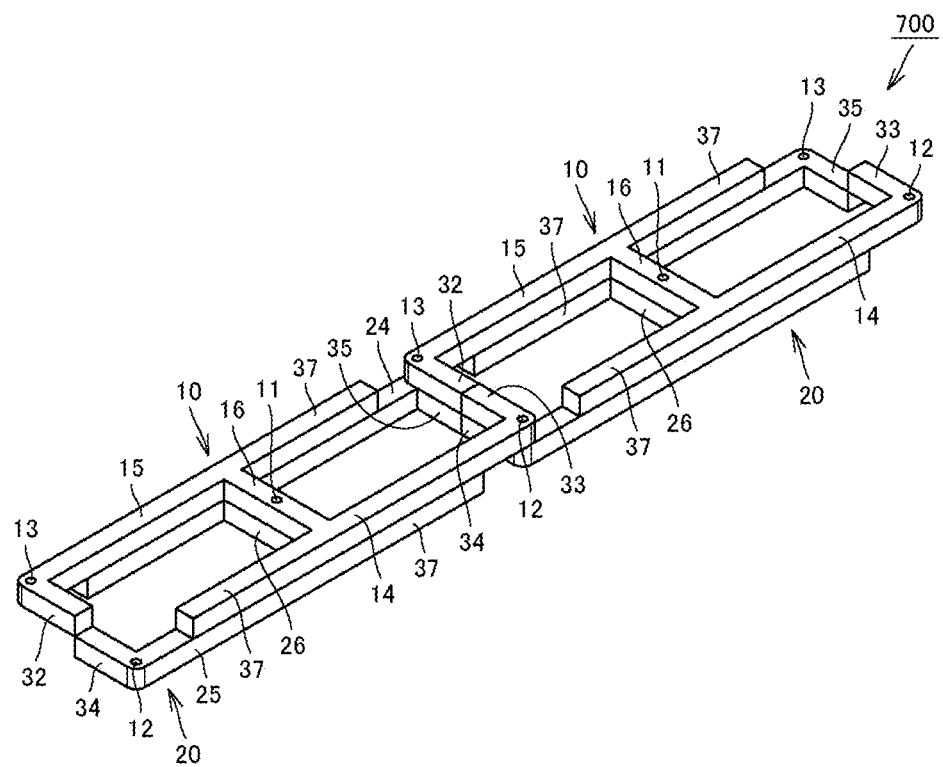
FIG. 12 is a perspective view of the extendable arm of FIG. 11.

Embodiment of FIGS. 11 and 12

An extendable arm 700 shown in FIGS. 11 and 12 is different from the extendable arm 300 shown in FIGS. 5 and 6 in that each of the strip-shaped one end portions 14, 24 and the strip-shaped other end portions 15, 25 of the first and second rigid members 10, 20 includes an extended strip portion 37 extended beyond the strip-shaped middle portion 16, 26. Each of the extended strip portions 37 overlaps the one end portion or the other end portion of the mating rigid member in the thickness direction of the first and second rigid members 10, 20. The extendable arm 700 thus has improved rigidity in the thickness direction.

In a modification of the extendable arm 700 shown in FIGS. 11 and 12, the strip-shaped portions of the first and second rigid members 10, 20 may have a T-shape in cross section including a horizontal bar portion and a vertical bar portion extending perpendicularly from the middle of the horizontal bar. In this case, the extendable arm 700 has further improved rigidity when configured so that the horizontal bar portion of the T-shape of the first rigid member 10 surface-contacts the horizontal bar portion of the T-shape of the second rigid member 20.

Figure 13:
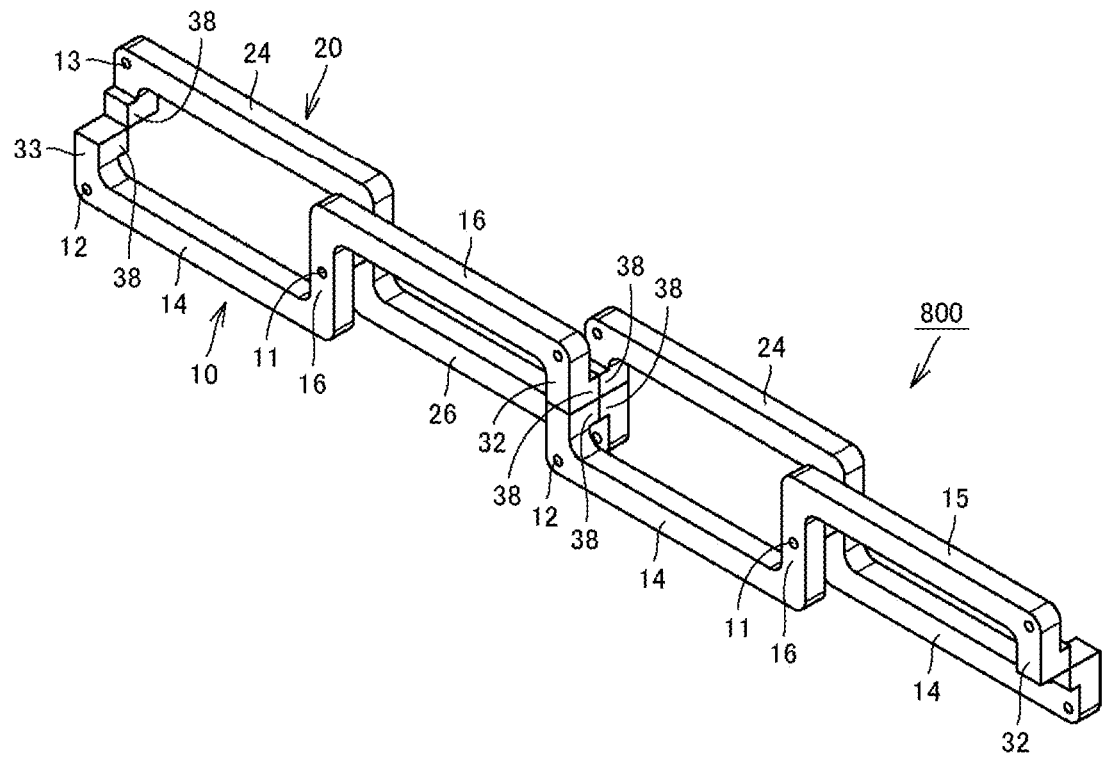
FIG. 13 is a front view of an extendable arm according to a yet further embodiment of the present invention in an extended state.
Figure 14:
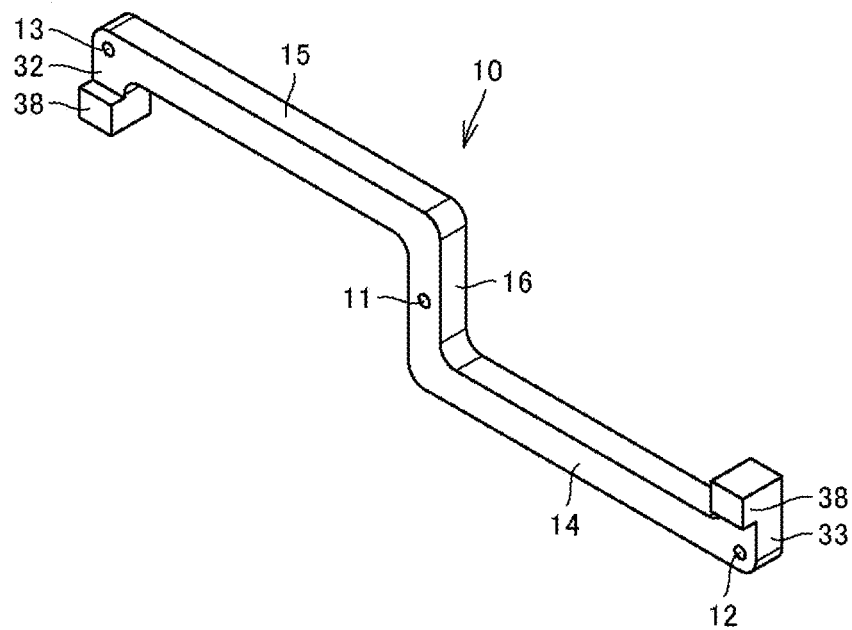
FIG. 14 is a perspective view of a rigid member of the extendable arm of FIG. 13.

Embodiment of FIGS. 13 and 14

An extendable arm 800 shown in FIGS. 13 and 14 is different from the extendable arm 300 shown in FIGS. 5 and 6 in that each of the tip-end projecting strip portions 32, 33, 34, 35 of the first and second rigid members 10, 20 has a thickened portion 38 at its tip end. When the extendable arm 800 is in an extended state, the thickened portions 38 abut on each other in the vertical and thickness directions. The extendable arm 800 in an extended state thus has improved thickness in the vertical and thickness directions.

Figure 15:
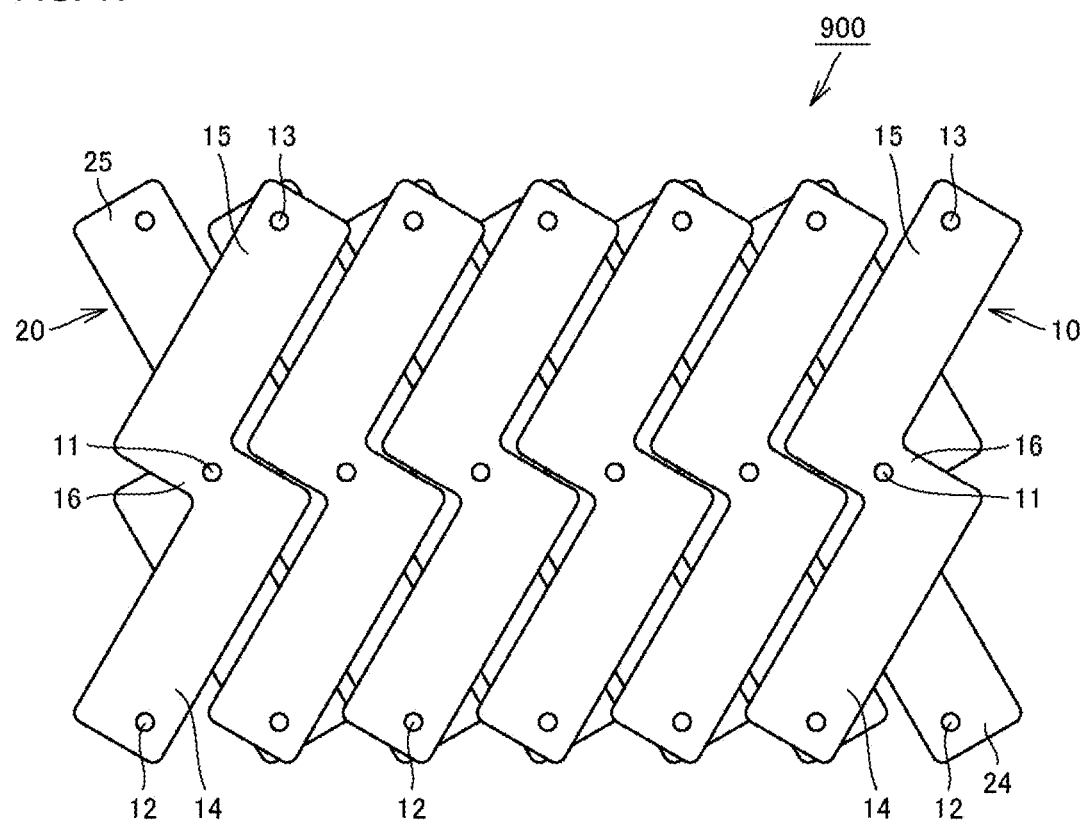
FIG. 15 is a front view of an extendable arm according to a yet further embodiment of the present invention in a contracted state.
Figure 16:
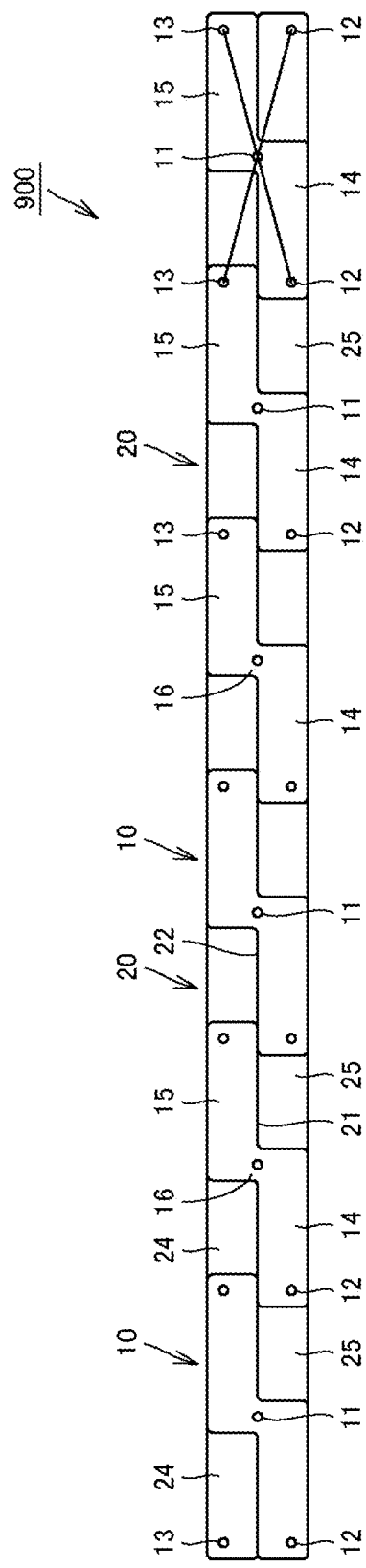
FIG. 16 is a front view of the extendable arm of FIG. 15 in an extended state.

Embodiment of FIGS. 15 and 16

An extendable arm 900 shown in FIGS. 15 and 16 is different from the extendable arm 100 shown in FIGS. 1 and 2 in that the strip-shaped one end portions 14, 24 and the strip-shaped other end portions 15, 25 of the first and second rigid members 10, 20 have an increased lateral dimension. When the extendable arm 900 is in an extended state, the inner side surface 22 of the one end portion 14 of the first rigid member 10 abuts on the inner side surface 21 of the other end portion 15 of the first rigid member 10 of its adjacent cross unit, and the inner side surface 22 of the one end portion 24 of the second rigid member 20 abuts on the inner side surface 21 of the other end portion 25 of the second rigid member 20 of its adjacent cross unit. The extendable arm 900 in an extended state thus has improved rigidity in the lateral direction (vertical direction).

Figure 17:
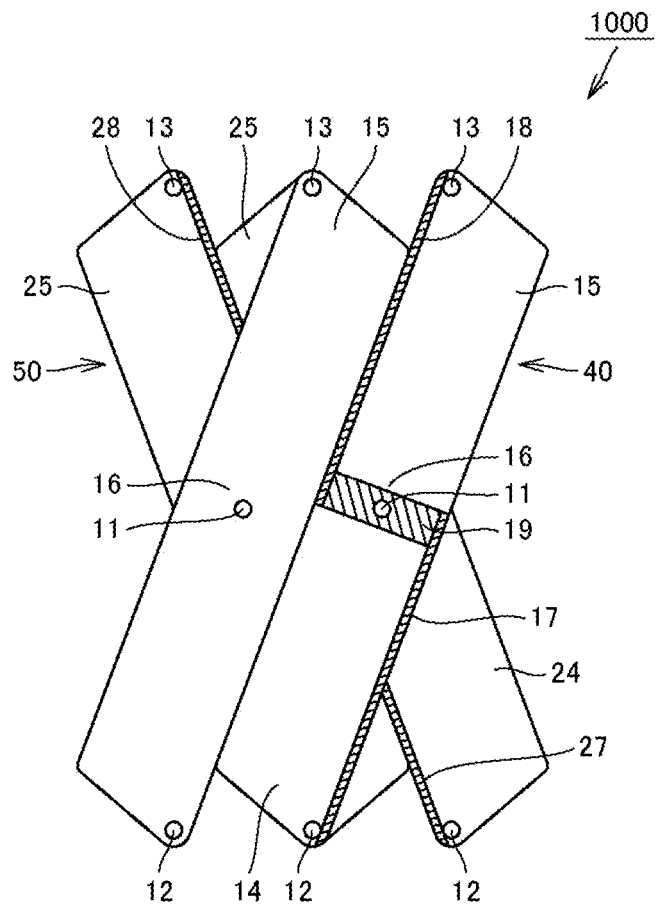
FIG. 17 is a front view of an extendable arm according to a yet further embodiment of the present invention in a contracted state.
Figure 18:
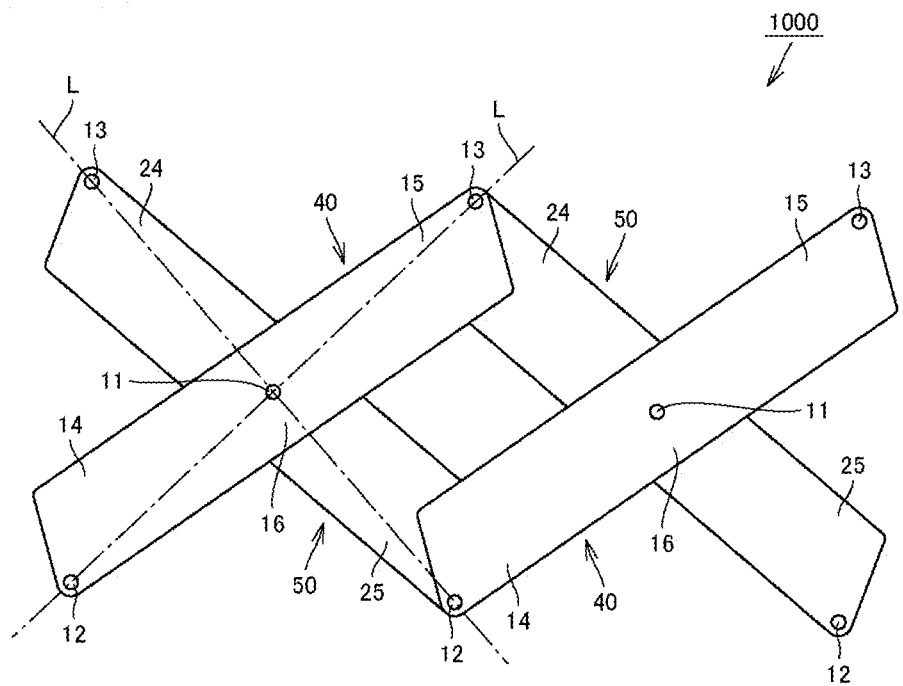
FIG. 18 is a front view of the extendable arm of FIG. 17 in an intermediately extended state.
Figure 19:
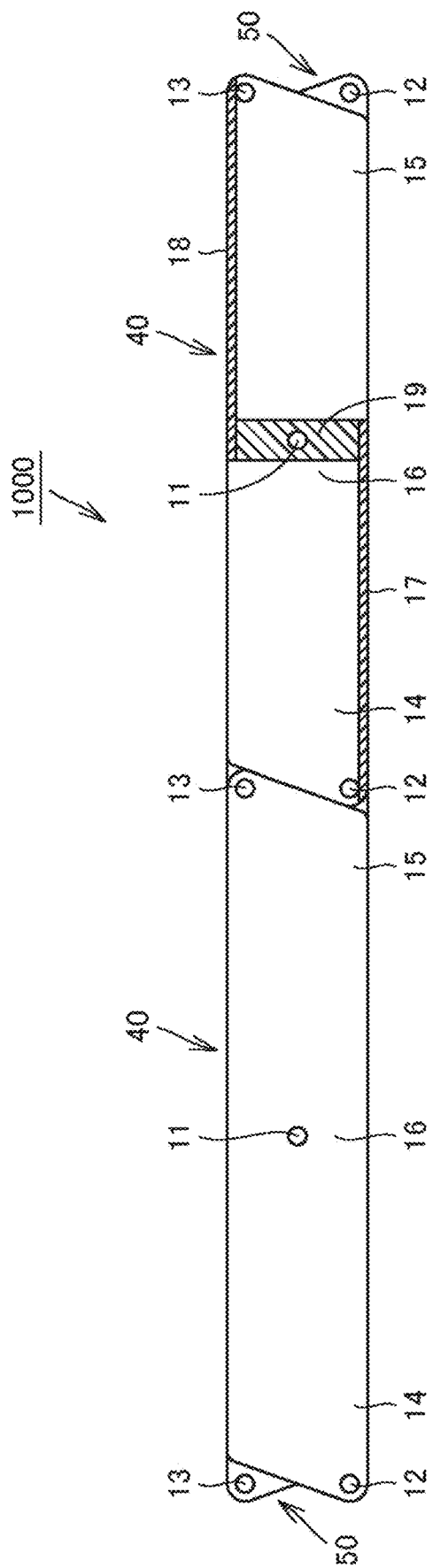
FIG. 19 is a front view of the extendable arm of FIG. 17 in an extended state.

Embodiment of FIGS. 17 to 19

A feature of an extendable arm 1000 shown in FIGS. 17 to 19 is that first and second rigid members 40, 50 have a parallelogram outer shape. The first and second rigid members 40, 50 are shaped so that an imaginary line L connecting the end coupling shafts 12, 13 and the middle coupling shaft 11 extends straight.

As shown in FIG. 19, when the extendable arm 1000 is in an extended state, the first rigid member 40 and the second rigid member 50 almost completely overlap each other along its entire length in the thickness direction. The bottom-side outer side surfaces 17 of the first and second rigid members 40, 50 linearly surface-contact a base surface when the extendable arm 1000 is placed thereon.

When the extendable arm 1000 is in an extended state, the bottom-side outer side surface 17 and the top-side outer side surface 18 of the first and second rigid members 40, 50 are aligned and are continuous with no step therebetween. The tip end face of one end portion of each rigid member 40, 50 abuts on the rear end face of the other end portion of the rigid member 40, 50 of its adjacent cross unit.

As shown in FIG. 19, one end portion of each rigid member 40, 50 includes the bottom-side outer side surface 17 that linearly surface-contacts the base surface when the extendable arm 1000 in an extended state is placed thereon. The other end portion of each rigid member 40, 50 includes the top-side outer side surface 18 that extends straight and parallel to the bottom-side outer side surface 17 of the rigid member 40, 50. A middle portion of each rigid member 40, 50 includes a middle strip region 19 passing through the middle coupling shaft 11 and perpendicular to the bottom-side outer side surface 17 and the top-side outer side surface 18 of the rigid member 40, 50.

The extendable arm 1000 has improved rigidity in the lateral direction of the extendable arm 1000 in an extended state (vertical direction in FIG. 19), the longitudinal direction of the extendable arm 1000 in an extended state (lateral direction in FIG. 19), and the thickness direction (direction perpendicular to the plane of paper of FIG. 19).

Figure 20:
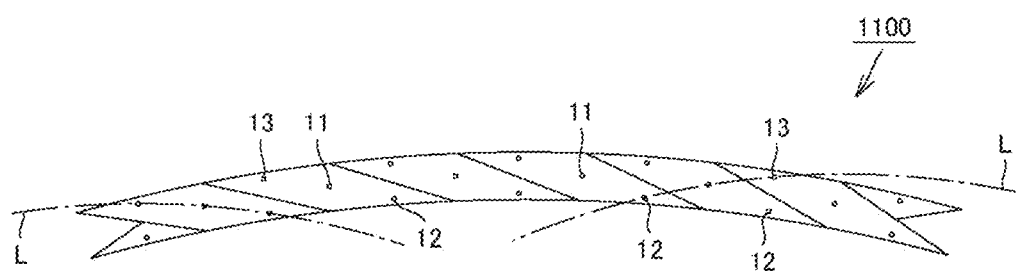
FIG. 20 is a front view of an extendable arm according to a yet further embodiment of the present invention in an extended state.

Embodiment of FIG. 20

An extendable arm 1100 shown in FIG. 20 is different from the extendable arm 1000 shown in FIGS. 17 to 19 in that the first and second rigid members 40, 50 are shaped so that an imaginary line L connecting the end coupling shafts 12, 13 and the middle coupling shaft 11 is curved in an arc shape. As shown in FIG. 20, the extendable arm 1100 has a curved shape when in an extended state.

Figure 21:
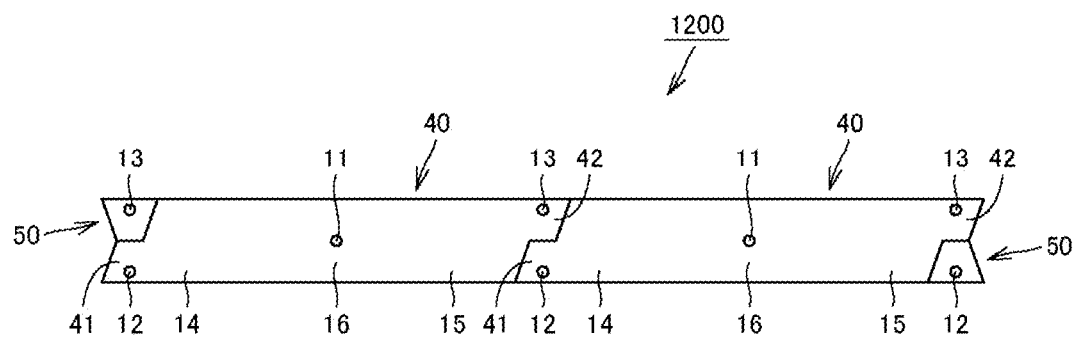
FIG. 21 is a front view of an extendable arm according to a yet further embodiment of the present invention in an extended state.

Embodiment of FIG. 21

An extendable arm 1200 shown in FIG. 21 is different from the extendable arm 1100 shown in FIGS. 17 to 19 in that the tip end face of the one end portion 14 of each rigid member 40, 50 has a first stepped portion with a step shape and the tip end face of the other end portion 15 of each rigid member 40, 50 has a second stepped portion 42 that mates with the first stepped portion 41.

Although some embodiments of the present invention are described above with reference to the drawings, the present invention is not limited to the illustrated embodiments. Various modifications or variations can be made to the illustrated embodiments without departing from the spirit and scope of the present invention.

The extendable arm according to the present invention can be used to produce structures such as variable area frames and variable volume three-dimensional structures. The extendable arm according to the present invention can therefore be used in many applications such as partitions, containers, architectural structures, exhibits, pavilions, play equipment, assembling toys, decorations, art objects, furniture, beds of vehicles, enclosures for animals such as pets, robot bodies, water tanks, pools, bathroom stalls, dressing stalls, shower stalls, above-ground buildings, underground buildings, underwater buildings, aerial buildings, temporary houses, warehouses, vegetable factories, tents, zoos, and botanical gardens.

The invention claimed is:

1. An extendable arm that is comprised of a plurality of cross units arranged in one direction and pivotally coupled to each other, each of the cross units being comprised of first and second rigid members crossing each other in an X shape and pivotally coupled at their intersection via a middle coupling shaft, and adjacent ones of the cross units being pivotally coupled at their ends via upper and lower end coupling shafts, wherein each of the rigid members includes one end portion including one of the end coupling shafts, the other end portion including the other end coupling shaft, and a middle portion including the middle coupling shaft, the one end portion of the first rigid member includes a bottom-side outer side surface that surface-contacts a base surface when the extendable arm in an extended state is placed thereon, the other end portion of the first rigid member includes a top-side outer side surface extending parallel to the bottom-side outer side surface of the first rigid member, the middle portion of the first rigid member includes a middle strip region passing through the middle coupling shaft and perpendicular to the bottom-side outer side surface and the top-side outer side surface of the first rigid member, the other end portion of the second rigid member includes a bottom-side outer side surface that surface-contacts the base surface when the extendable arm in the extended state is placed thereon, the one end portion of the second rigid member includes a top-side outer side surface extending parallel to the bottom-side outer side surface of the second rigid member, and the middle portion of the second rigid member includes a middle strip region passing through the middle coupling shaft and perpendicular to the bottom-side outer side surface and the top-side outer side surface of the second rigid member.

2. The extendable arm according to claim 1, wherein each of the rigid members is shaped so that an imaginary line connecting the end coupling shafts and the middle coupling shaft extends straight.

3. The extendable arm according to claim 1, wherein each of the rigid members is shaped so that an imaginary line connecting the end coupling shafts and the middle coupling shaft is curved in an arc shape.

4. The extendable arm according to claim 1, wherein the one end portion, the middle portion, and the other end portion of each of the rigid members have a strip shape, and the strip-shaped one end portion and the strip-shaped middle portion meet at right angles, and the strip-shaped middle portion and the strip-shaped other end portion meet at right angles.

5. The extendable arm according to claim 4, wherein at least one of the strip-shaped one end portion and the strip-shaped other end portion of each of the rigid members includes a tip-end projecting strip portion extending parallel to the strip-shaped middle portion from a tip end of the at least one of the strip-shaped one end portion and the strip-shaped other end portion.

6. The extendable arm according to claim 5, wherein when the extendable arm is in the extended state, a tip end face of the tip-end projecting strip portion abuts on an inner side surface of the rigid member of the adjacent cross unit.

7. The extendable arm according to claim 5, wherein both the strip-shaped one end portion and the strip-shaped other end portion of each of the rigid members include the tip-end projecting strip portion, and when the extendable arm is in the extended state, a tip end face of each of the tip-end projecting strip portions abuts on a tip end face of the tip-end projecting strip portion of the rigid member of the adjacent cross unit.

8. The extendable arm according to claim 1, wherein when the extendable arm is in the extended state, an inner side surface of the one end portion of the first rigid member abuts on an inner side surface of the other end portion of the first rigid member of the adjacent cross unit, and when the extendable arm is in the extended state, an inner side surface of the one end portion of the second rigid member abuts on an inner side surface of the other end portion of the second rigid member of the adjacent cross unit.

9. The extendable arm according to claim 1, wherein each of the rigid members has a parallelogram outer shape, and an outer side surface of each of the rigid members surface-contacts the base surface when the extendable arm in the extended state is placed thereon, and when the extendable arm is in the extended state, a tip end face of the one end portion of each of the rigid members abuts on a rear end face of the other end portion of the rigid member of the adjacent cross unit.

10. The extendable arm according to claim 9, wherein a tip end face of the one end portion of each of the rigid members has a first stepped portion with a step shape, and a tip end face of the other end portion of each of the rigid members has a second stepped portion that mates with the first stepped portion.

* * * * *